(12) United States Patent
Schimanek et al.

(10) Patent No.: US 10,081,254 B2
(45) Date of Patent: Sep. 25, 2018

(54) METHOD FOR COUPLING AT LEAST ONE SECONDARY ENERGY SOURCE TO AN ENERGY SUPPLY NETWORK, IN PARTICULAR AN ON-BOARD VEHICLE POWER SUPPLY

(71) Applicant: Bayerische Motoren Werke Aktiengesellschaft, Munich (DE)

(72) Inventors: Thomas Schimanek, Woerthsee (DE); Christopher Kolbeck, Ergoldsbach (DE); Florian Pfattrisch, Geretsried-Gelting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 292 days.

(21) Appl. No.: 15/004,033

(22) Filed: Jan. 22, 2016

(65) Prior Publication Data
US 2016/0137074 A1 May 19, 2016

Related U.S. Application Data

(63) Continuation of application No. PCT/EP2014/065113, filed on Jul. 15, 2014.

(30) Foreign Application Priority Data

Jul. 24, 2013 (DE) .................. 10 2013 214 421

(51) Int. Cl.
*B60L 11/18* (2006.01)
*H02J 1/10* (2006.01)
(Continued)

(52) U.S. Cl.
CPC ........... *B60L 11/1803* (2013.01); *B60L 8/003* (2013.01); *B60L 11/1868* (2013.01);
(Continued)

(58) Field of Classification Search
CPC .................................................. B06L 11/1803
(Continued)

(56) References Cited

U.S. PATENT DOCUMENTS

2006/0103358 A1 5/2006 Schulte et al.
2006/0127704 A1 6/2006 Raiser
(Continued)

FOREIGN PATENT DOCUMENTS

DE 10 2009 028 972 A1 3/2011
DE 10 2011 083 453 A1 3/2013

OTHER PUBLICATIONS

Akira Nishizawa et al., "Fuel cell and Li-ion battery direct hybridization system for aircraft applications", Journal of Power Sources, vol. 222, 2013, pp. 294-300.
(Continued)

*Primary Examiner* — Joseph Chang
(74) *Attorney, Agent, or Firm* — Crowell & Moring LLP

(57) ABSTRACT

A method is provided for coupling at least one secondary energy source to an power supply network, in particular an on-board vehicle power supply, wherein a load is connected with a primary energy source having a first voltage characteristic. The at least one secondary energy source has a second voltage characteristic which has an operating voltage range overlapping with the first voltage characteristic. The primary energy source and the at least one secondary energy source can be connected via a power switching device to a node point of an intermediate circuit of the power supply network, to which the load is also connected. Before connecting a secondary energy source, the current drawn by the load is regulated such that the voltage connected to the node point of the intermediate circuit corresponds to a no-load voltage of the secondary energy source to be connected or is around the no-load voltage in a specified voltage range. In
(Continued)

the case that the voltages correspond or if the voltage connected to the node point lies in the specified voltage range, the secondary energy source is electrically conductively connected to the node point via the power switching device. The current required by the load is regulated to the corresponding value, wherein the load is supplied from the primary and the secondary energy source.

20 Claims, 3 Drawing Sheets

(51) Int. Cl.
*B60L 8/00* (2006.01)
*B60R 16/033* (2006.01)
*H01M 16/00* (2006.01)
*B60R 16/03* (2006.01)

(52) U.S. Cl.
CPC ........ *B60L 11/1887* (2013.01); *B60R 16/033* (2013.01); *H02J 1/10* (2013.01); *H02J 1/102* (2013.01); *B60L 2240/547* (2013.01); *B60R 16/03* (2013.01); *H01M 16/006* (2013.01); *Y02T 10/7066* (2013.01); *Y02T 10/7083* (2013.01); *Y02T 90/34* (2013.01)

(58) Field of Classification Search
USPC ........................................... 307/10.1
See application file for complete search history.

(56) References Cited

U.S. PATENT DOCUMENTS

| 2011/0234177 | A1 | 9/2011 | Kohara et al. |
| 2012/0206103 | A1 | 8/2012 | Butzmann |
| 2014/0070736 | A1* | 3/2014 | Gorka ............... B60L 11/005 318/139 |
| 2014/0203636 | A1 | 7/2014 | Goetz et al. |

OTHER PUBLICATIONS

International Search Report (PCT/ISA/210) issued in PCT Application No. PCT/EP2014/065113 dated Oct. 8, 2014, with English translation (six (6) pages).
German Search Report issued in counterpart German Application No. 10 2013 214 421.0 dated Mar. 24, 2014, with partial English translation (ten (10) pages).

* cited by examiner

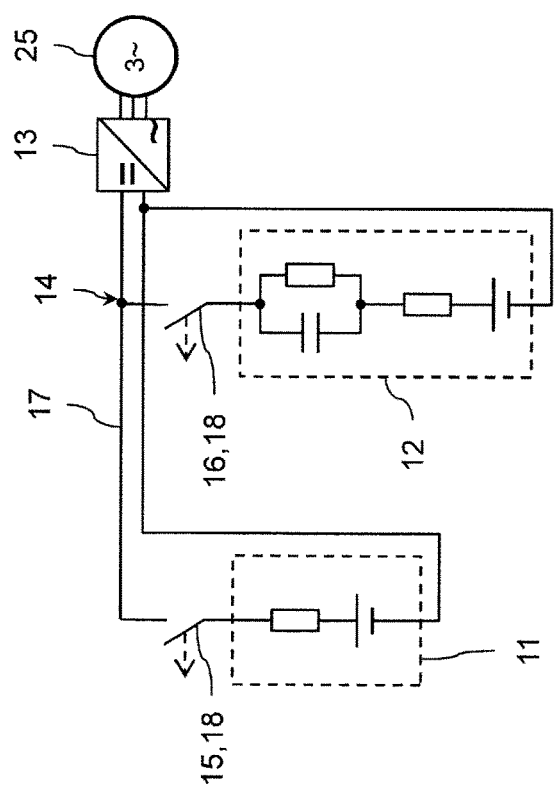
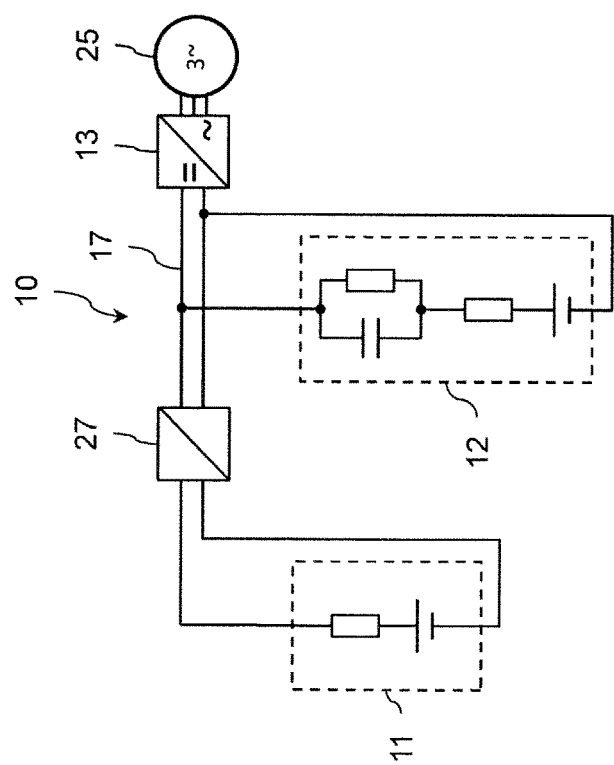
Fig. 1
Fig. 2

METHOD FOR COUPLING AT LEAST ONE SECONDARY ENERGY SOURCE TO AN ENERGY SUPPLY NETWORK, IN PARTICULAR AN ON-BOARD VEHICLE POWER SUPPLY

CROSS REFERENCE TO RELATED APPLICATIONS

This application is a continuation of PCT International Application No. PCT/EP2014/065113, filed Jul. 15, 2014, which claims priority under 35 U.S.C. § 119 from German Patent Application No. 10 2013 214 421.0, filed Jul. 24, 2013, the entire disclosures of which are herein expressly incorporated by reference.

BACKGROUND AND SUMMARY OF THE INVENTION

The invention relates to a method for coupling at least one secondary energy source to a power supply system and a power supply system, particularly a vehicle onboard power supply system, to which a load and a primary energy source are connected.

Need-based coupling of various energy sources to a load during the operation thereof generally requires at least one current regulator in order to avoid high compensating currents or switching currents at the moment at which an unloaded, secondary energy source is connected to a primary energy source loaded by the load. Such a situation exists in a vehicle onboard power supply system, for example, which includes a primary energy source, for example a fuel cell or a high-voltage battery, that supplies power to the loads connected to the onboard power supply system. By way of example, such a load may be an inverter that supplies power to an electric (drive) machine as a consumer. The current regulator normally used in such a vehicle onboard power supply system is a DC/DC converter. The task of a DC/DC converter is to use current or voltage regulation to avoid the aforementioned compensating currents in order to prevent destruction, e.g. of an intermediate circuit capacitor that is connected to an input of the inverter.

However, a DC/DC converter, which is used particularly in the high-power drive domain, entails substantial costs and also has a high weight and requires a large installation space. In addition, there is the problem that the operation of a DC/DC converter involves losses of efficiency that reduce energy efficiency, particularly in an electrically operated vehicle.

It is an object of the present invention to provide methods that allow connection and disconnection, i.e. coupling and decoupling, of a secondary energy source to/from a power supply system, particularly a vehicle onboard power supply system, with reduced losses and, at the same time, minimized design complexity. It is also an object of the present invention to provide a power supply system, particularly a vehicle onboard power supply system, that can be operated with minimal losses when a plurality of energy sources are used.

These and other objects are achieved by methods and a power supply system according to embodiments of the invention.

A method for coupling at least one secondary energy source to a power supply system, particularly a vehicle onboard power supply system, to which a load and a primary energy source having a first voltage characteristic are connected, is provided. The at least one secondary energy source has a respective second voltage characteristic that has an operating voltage range that overlaps the first voltage characteristic. The primary energy source and the at least one secondary energy source can be connected to a node of an intermediate circuit of the power supply system, to which node the load is also connected, via a power switching apparatus.

In this method, connection (coupling) of a respective secondary energy source is preceded by the current drawn by the load or the power drawn by the load being regulated such that the voltage that is present at the node of the intermediate circuit corresponds to the no-load voltage of the secondary energy source that is to be connected or is situated in a prescribed voltage range around the no-load voltage. When the voltages correspond to one another or when the voltage that is present at the node is situated in the prescribed voltage range, the secondary energy source is electrically conductively connected to the node via the power switching apparatus. Subsequently, the current required by the load or the power required by the load is regulated to the relevant value, the load being fed from the primary and secondary energy sources.

Additionally, a method for decoupling at least one secondary energy source from a power supply system, particularly a vehicle onboard power supply system, to which not only the at least one secondary energy source but also a load and a primary energy source having a first voltage characteristic are connected, is provided. The at least one secondary energy source has a respective second voltage characteristic that has an operating voltage range that overlaps the first voltage characteristic. The primary energy source and the at least one secondary energy source are connected to a node of an intermediate circuit of the power supply system, to which node the load is also connected, via a power switching apparatus.

Disconnection of a respective secondary energy source is preceded by the current drawn by the load or the power drawn by the load being regulated such that the voltage that is present at the node of the intermediate circuit corresponds to the no-load voltage of the secondary energy source that is to be disconnected (decoupled) or is situated in a prescribed voltage range around the no-load voltage. When the voltages correspond to one another or when the voltage that is present at the node is situated in the prescribed voltage range, the secondary energy source is electrically isolated from the node via the power switching apparatus. The current required by the load or the power required by the load is then regulated to the relevant value, the load then being fed exclusively from the primary energy source.

This approach is based on the consideration that instead of the regulation of a current regulator that has been performed hitherto, the load supplied with power by the primary energy source is conditioned in the switching process to the extent that its voltage level is identical to the rated no-load voltage of the secondary energy source or is situated in a prescribed voltage range around the no-load voltage and hence can be connected and disconnected without any high compensating or switching currents arising. The risk of destruction of the load connected to the intermediate circuit or of the power switching apparatus is thereby eliminated. The principle can be applied to various switching processes and allows direct coupling of different energy sources by means of the power switching apparatus. The power switching apparatus, which comprises controllable switching arrangements that are each associated with the primary energy source and the at least one secondary energy source, connects the energy sources to one another directly in this case, i.e. connects the energy sources directly to the node of the intermediate circuit or isolates them from the node of the intermediate circuit.

In comparison with a conventional DC/DC converter, the power switching apparatus that is necessary for realizing the method is of much simpler design and, above all, operates almost with no losses. The power switching apparatus can be formed from a number of switching elements that allow a respective energy source to be electrically connected to or blocked from the node of the intermediate circuit.

The invention also provides a power supply system, particularly a vehicle onboard power supply system. The power supply system comprises a load, a primary energy source having a first voltage characteristic and at least one secondary energy source, wherein the at least one secondary energy source has a respective second voltage characteristic that has an operating voltage range that overlaps the first voltage characteristic. The primary energy source and the at least one secondary energy source can be connected to a node of an intermediate circuit of the power supply system, to which node the load is also connected, via a power switching apparatus. In addition, the power supply system comprises a unit for regulating the current drawn by the load or the power drawn by the load.

In a power supply system in such a form, the losses for coupling a plurality of energy sources that can be selectively connected to an intermediate circuit can be kept very low. Furthermore, the large and expensive DC/DC converter used hitherto can be eliminated, allowing costs, weight and installation space to be saved. Similarly, a power switching apparatus that has switching elements can increase the fail-safety of the power supply system.

According to one expedient embodiment of the method, the load is regulated over such a short period of time that a load interruption is imperceptible. In a vehicle, for example, this means that the load is varied completely or just in part for a very short time in an order of magnitude of less than 100 ms, particularly less than 10 ms. By analogy, this corresponds to operation of a clutch in a conventional, manual gearbox of an internal combustion engine with the difference that the load variation can be performed very much more quickly and this is therefore imperceptible to the occupants of the vehicle.

According to a further expedient embodiment, measurement of a first voltage is performed at the terminals of the primary energy source or at other suitable points and measurement of a second voltage is performed at the terminals of the at least one secondary energy source or at other suitable points. The load regulation matches the voltage of the primary energy source to the no-load voltage of the secondary energy source that is to be switched. As soon as the two measured voltages correspond to one another, the secondary energy source is switched by way of the load switching apparatus.

As is already clear from the description above, the load regulation is realized by influencing the operating point of the load.

The power supply system is also distinguished in that its power switching arrangements of the primary energy source and the at least one secondary energy source each comprise associated controllable switching arrangements. The switching arrangements can each include at least one semiconductor switching element or a contactor. Other switching elements can also be used in principle. The choice and embodiment of the respective switching arrangements is dependent on the associated energy source. By way of example, some energy sources may require the avoidance of a current flowing into them in order to avoid damage or an uncontrolled state. This means that some switching elements are preferred or used in a particular interconnection, while other energy sources have no particular precautions or requirements for the switching element(s) used.

By way of example, the primary energy source may be a fuel cell or a rechargeable battery. The secondary energy source may be a rechargeable battery, a solar module, a fuel cell and the like.

The load may be an actuating element, particularly a DC/DC converter or an AC/DC converter, with at least one consumer being connected to the actuating element. By way of example, the consumer may be an electric machine, which can be operated by motor or by generator, or another consumer.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic illustration of a conventional power supply system used in vehicles;

FIG. 2 is a schematic illustration of a power supply system in a form according to an embodiment of the invention and intended for use in a vehicle;

DETAILED DESCRIPTION OF THE DRAWINGS

Figure 3:
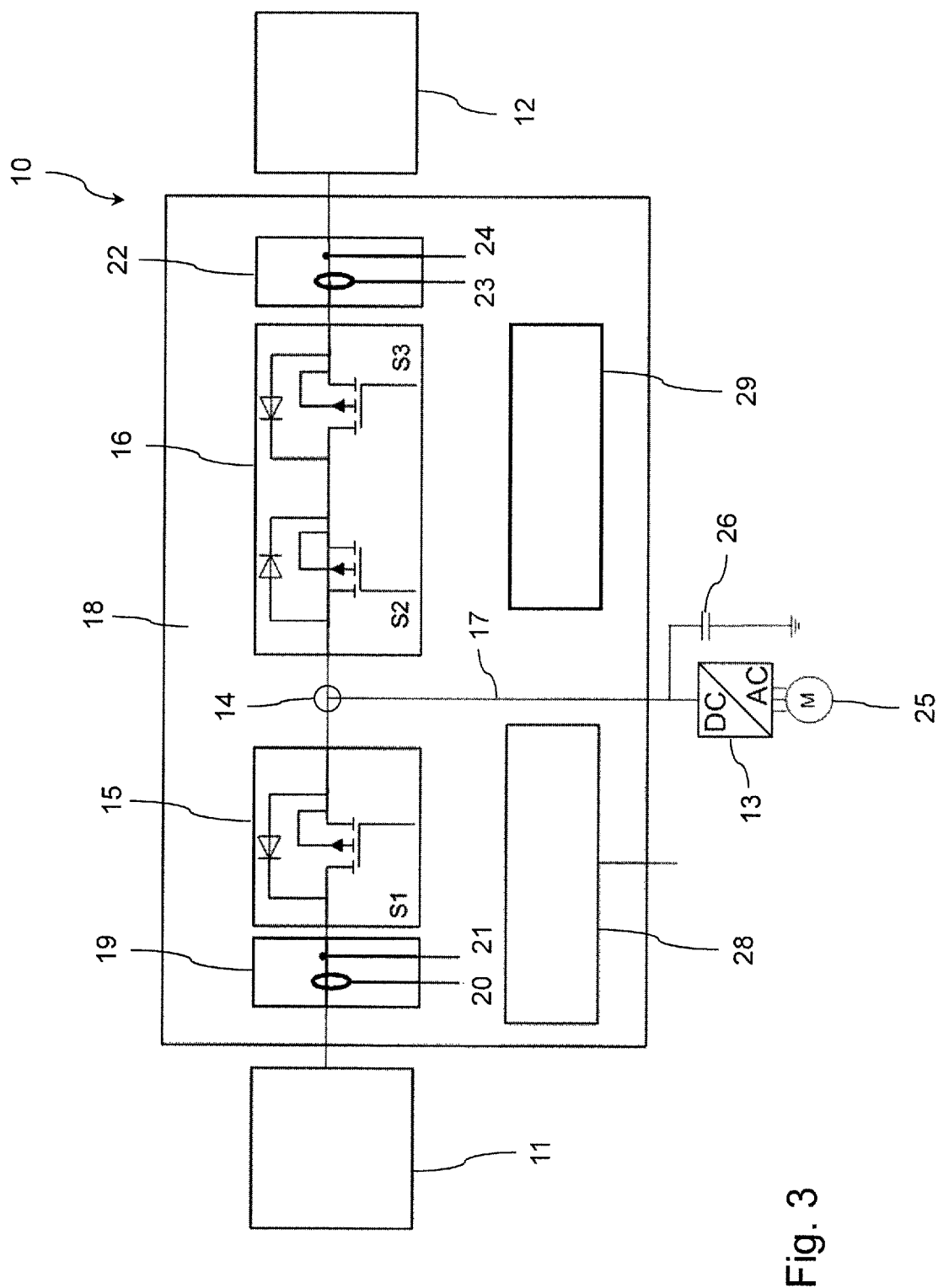
FIG. 3 is a schematic illustration of a power supply system in a form according to the invention, in which an exemplary embodiment of a power switching apparatus is shown.

FIG. 1 shows a schematic illustration of a conventional power supply system 10 used in a vehicle. The power supply system 10 is subsequently referred to as a vehicle onboard power supply system or onboard power supply system. In this exemplary embodiment, merely by way of example, the onboard power supply system 10 includes a primary energy source 11, e.g. a fuel cell, and a secondary energy source 12, e.g. a battery. The primary energy source 11 is coupled to an intermediate circuit 17 via a current regulator 27, for example in the form of a DC/DC converter. The secondary energy source 12 is (always) connected to the intermediate circuit 17 directly. In addition, the intermediate circuit 17 has a load 13 connected to it. In this exemplary embodiment, the load 13 is an AC/DC converter, the output side of which is connected to a consumer 25 in the form of a three-phase electric machine.

The task of the current regulator 27 is to perform load distribution between the primary energy source 11 and the secondary energy source 12.

The size and the installation space of the current regulator 27 are dependent on the current or power requirement of the load 13 and of the consumer 25 connected thereto. If the consumer 25 is an electric drive machine of a vehicle, a significant size is needed with corresponding weight and installation space requirements. Accommodating the current regulator 27 into the vehicle becomes difficult as its size increases. In addition, the operation of the current regulator 27 involves losses, since, while the load 13 is supplied with power, it is always necessary, i.e. even when the secondary energy source 12 is not needed for supplying power to the load 13, for the current regulator 17 to be operated.

In the power supply system according to an embodiment of the invention shown in FIG. 2, the current regulator 27 is replaced by a power switching apparatus 18. The power switching apparatus 18 includes a first controllable switching arrangement 15, which is associated with the primary energy source 11, and a second controllable switching arrangement 16, which is associated with the secondary energy source 12. In the simplest case, each of the switching arrangements 15, 16 has a respective single switching element, for example in the form of a semiconductor element (MOSFET or IGBT) or a contactor.

The power switching apparatus 18 allows dynamic load distribution. In this case, the secondary energy source 12 is connected or disconnected via the power switching apparatus 18 in combination with load regulation of the load 13 prior to the switching process by a control unit—which is not shown in more detail in FIG. 2. In comparison with the conventional current regulator 27, a power switching apparatus 18 can be provided in much more compact form and with a lower weight. Furthermore, losses are also much lower than in the case of a current regulator, since during the operation of the power switching apparatus 18, it is only on-state losses from the switching elements of a respective switching arrangement 15, 16 that arise. These are very low, particularly in the case of contactors and semiconductor switching elements.

FIG. 3 shows a schematic illustration of a power supply system in a form according to the invention, in which an exemplary embodiment of a power switching apparatus 18 is shown. It is again assumed that the primary energy source 11 is a fuel cell and the secondary energy source 12 is a battery, although other setups are also possible.

The first controllable switching arrangement 15, which is associated with the primary energy source 11, includes a first switching element S1, in the form of a MOSFET. The switching arrangement 15 is arranged between a node 14 of the intermediate circuit 17 and the primary energy source 11. The terminals of the primary energy source 11 also have a first measuring device 19 connected to them that includes a current measuring device 20 and a voltage measuring device 21.

The second controllable switching arrangement 16, which is associated with the secondary energy source 12, is coupled between the node 14 and the secondary energy source 12. The second switching arrangement 16 includes two antiseries-interconnected semiconductor switches S2, S3 in the form of MOSFETs. The antiseries-interconnected semiconductor switches S2, S3 are switched on when an electrical connection between the secondary energy source 12 and the node 14 needs to be set up. Owing to the embodiment as MOSFETs and the diodes that are fundamentally present, the switching elements S2, S3 in the interconnection shown are necessary in order to reliably prevent, in the deactivated state, a flow of current both from the node 14 to the secondary energy source 12 and in the opposite direction. The terminals of the secondary energy source 12 additionally have a second measuring device 22 connected to them that includes a current measuring device 23 and a voltage measuring device 24.

As is also evident from this illustration, the load 13 (again in the form of an AC/DC converter) is connected to the node 14 of the intermediate circuit 17 with an intermediate circuit capacitor 26. In addition, a control unit 28 is shown that includes drivers for switching elements S1, S2, S3 of the switching arrangements 15, 16. The control unit 28 is connected to a bus of the vehicle for the purpose of exchanging data with other controllers and/or sensors.

The current and voltage values—which are determined by the measuring devices 22, 24, in particular continuously—of the currents and voltages that are present on the energy sources 11, 12 are supplied to a control unit 29. This control unit performs regulation for the load 13 in the manner described below, in order to allow the secondary energy source 12 to be connected and disconnected to/from the intermediate circuit 17 without a compensating current or switching current flowing during a switching process.

Figure 4:
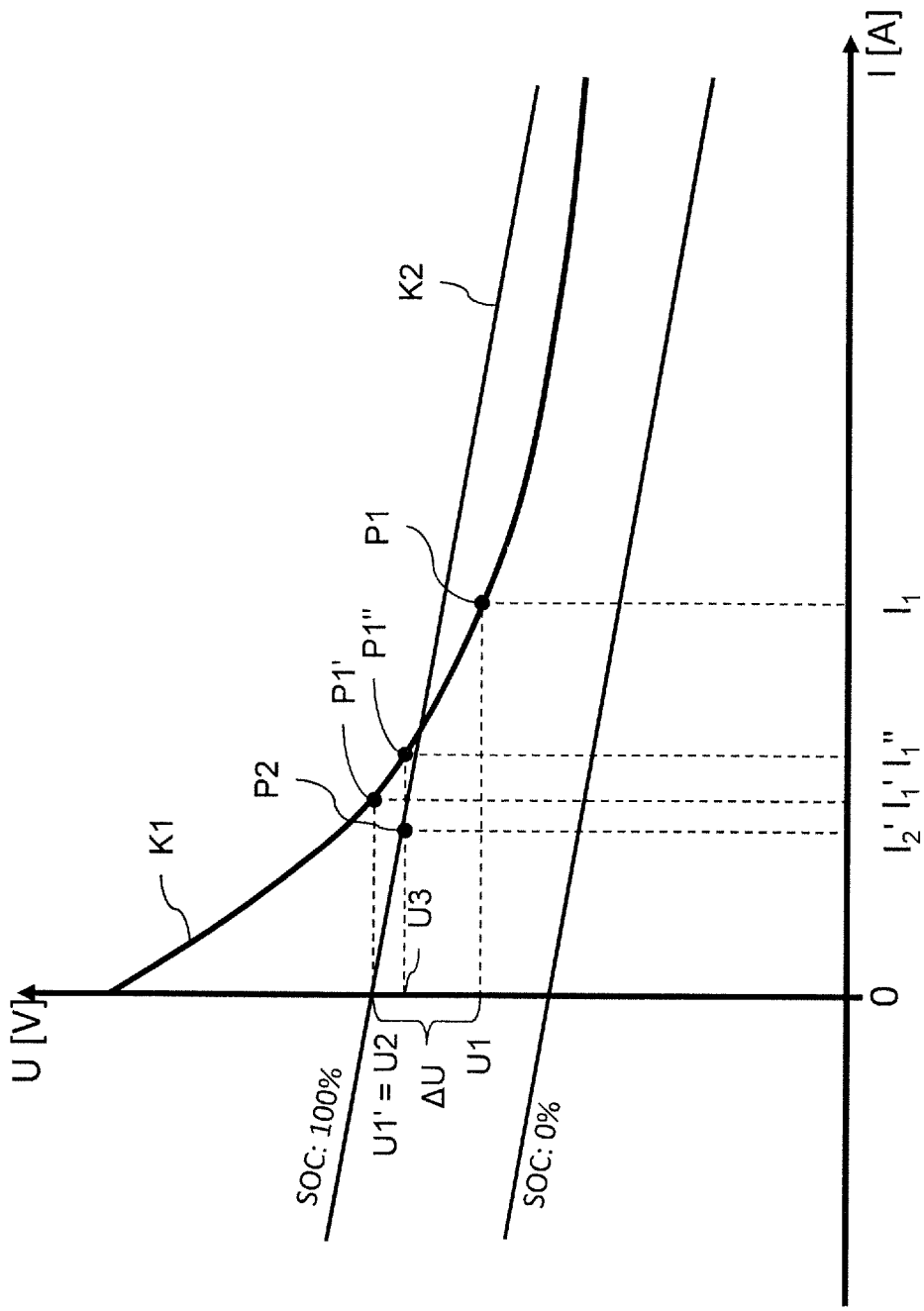
FIG. 4 is a voltage/current graph that illustrates the principle on which the method according to the invention is based.

FIG. 4 shows a voltage/current graph in which the schematic U/I characteristic curves of the primary energy source 11 (fuel cell) and the secondary energy source 12 (battery) are plotted. For the explanation that follows, it is assumed by way of simplification that the state of charge (SOC) of the secondary energy source 12 is constant. This means that a single U/I characteristic curve (in this case with the SOC=100%) for the secondary energy source 12 is considered. This is denoted by K2.

It is first of all assumed that the load 13 is supplied with power only from the primary energy source 11. This means that the primary energy source 11 is connected to the node 14 of the intermediate circuit 17 and to the load 13 via the switching arrangement 15. Depending on the operating state of the load 13 (or of the consumer 25 connected to the load), a particular current $I_1$ is obtained, with a voltage U1 that corresponds to the characteristic curve K1 of the fuel cell appearing at the terminals of the primary energy source 11 on the basis of this current $I_1$. This operating point is denoted by P1.

It is subsequently assumed that the load requirement by the load 13 or the consumer 25 increases, for which reason the load 13 needs to be supplied with power not only by the primary energy source 11 but also additionally by the secondary energy source 12. The no load voltage of the secondary energy source is denoted by U2 in FIG. 4. As can easily be seen, a voltage difference ΔU between the voltages U1 and U2 is obtained, which means that a compensating current would result without further precautions when the switching arrangement 16 is activated to connect the secondary energy source 12 to the node 14.

To avoid this compensating current, load regulation is effected for the load 13 such that connection of the secondary energy source 12 (as a result of the switching arrangement 16 being switched on) is preceded by the voltage that is present at the node 14 of the intermediate circuit 17 being made to correspond to the no-load voltage U2 of the secondary energy source 12 that is to be connected or, alternatively, being made to be in a prescribed voltage range around the no-load voltage. This means that the current drawn by the load 13 is reduced to such an extent that the voltage U1 corresponds to the voltage U2 or, in the case of the cited alternative, is situated in a prescribed voltage range around the voltage U2. The former is the case with the current $I'_1$ in FIG. 4. As soon as the voltages of the energy sources 11, 12 in this example correspond to one another (i.e. U2=U1'), the switching arrangement 16 is operated (switched on), so that the secondary energy source 12 is now likewise electrically conductively connected to the node 14. Subsequently, fresh load regulation from the load 13 is effected by a control unit in order to provide the current that is required for operation of the load, which current is now provided proportionally by the primary and secondary energy sources 11, 12 and is obtained from the sum of $I''_1$ and $I'_2$ at the voltage U3 (points P1" and P2).

If the current through the load 13 can be reduced again, e.g. on account of a lower power requirement by the consumer 25, or if it is no longer possible for further current to be drawn from the secondary energy source 12 for other reasons (for example a prescribed, lower state of charge of the battery being reached), then the secondary energy source 12 is disconnected from the node 14 in converse fashion. This means that the current from the load 13 is reduced such that the voltage at the node 14 corresponds to the no-load voltage U2 of the secondary energy source 12 or is situated in a prescribed voltage range around the voltage U2. As soon as this state has been reached, the switching arrangement 16 is switched off. It is subsequently possible for fresh load regulation to be effected such that the current from the load 13 is increased again, with the current now being provided exclusively from the primary energy source 11.

The load variation of the load 13 can, in practice, be effected so quickly that the variation is unnoticeable to an occupant of the vehicle. The changeover processes described can be effected in less than 100 ms, particularly less than 10 ms even. Owing to the inertia of the system, the load fluctuations are unnoticeable to the occupant.

In the description above, the energy supply system has been described with reference to a fuel cell and a battery. In principle, it is also possible for other energy sources to be used. By way of example, the method can be carried out with two batteries as the primary and secondary energy sources. In this case, the batteries may be either low-voltage batteries or high-voltage batteries. The secondary energy source may also be a solar cell. A respective energy source can be designed either just to output current or to output and receive current (storage battery). This then requires the use of switching arrangements that are matched to the energy sources.

The method can be carried out so long as the primary and secondary energy sources have voltage characteristics that overlap in a voltage range. The larger the overlapping voltage range, the larger the usable power spectrum during operation.

In a modification of the described method that is not shown, the method can also be implemented using more than two energy sources. The load variations described are then performed in the manner described above when a respective secondary energy source is connected or disconnected.

It goes without saying that the proposed method can also be used in other power supply systems outside vehicle onboard power supply systems.

LIST OF REFERENCE SYMBOLS 10 power supply system
11 primary energy source
12 secondary energy source
13 load
14 node
15 first controllable switching arrangement
16 second controllable switching arrangement
17 intermediate circuit
18 power switching apparatus
19 first measuring device
20 current measurement
21 voltage measurement
22 second measuring device
23 current measurement
24 voltage measurement
25 consumer
26 intermediate circuit capacitor
27 current regulator
28 control unit
29 control unit for energy source coupling The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for coupling at least one secondary energy source to a power supply system to which a load and a primary energy source having a first voltage characteristic are connected, wherein the at least one secondary energy source has a respective second voltage characteristic that has an operating voltage range that overlaps the first voltage characteristic, and wherein the primary energy source and the at least one secondary energy source are connectable, via a power switching apparatus, to a node of an intermediate circuit of the power supply system, to which node the load is connected, the method comprising the acts of:
   a) prior to connecting a respective secondary energy source, regulating a current drawn by the load such that a voltage that is present at the node of the intermediate circuit corresponds to a no-load voltage of the secondary energy source that is to be connected or is situated in a prescribed voltage range around the no-load voltage;
   b) when the voltages correspond to one another or when the voltage that is present at the node is situated in the prescribed voltage range, electrically conductively connecting the secondary energy source to the node via the power switching apparatus; and
   c) regulating the current required by the load to a relevant value, the load being fed from the primary and secondary energy sources.

2. The method according to claim 1, wherein the load is regulated over a defined minimal period of time.

3. The method according to claim 2, wherein the load is regulated in an order of magnitude of less than 100 msec.

4. The method according to claim 1, wherein measurement of a first voltage is performed at terminals of the primary energy source and measurement of a second voltage is performed at terminals of the at least one secondary energy source, the load regulation in act a) matching the voltage of the primary energy source to the no-load voltage of the secondary energy source that is to be switched.

5. The method according to claim 1, wherein the load regulation is carried out by influencing an operating point of the load.

6. The method according to claim 1, wherein the power supply system is a vehicle onboard power supply system.

7. A method for decoupling at least one secondary energy source from a power supply system to which not only the at least one secondary energy source but also a load and a primary energy source having a first voltage characteristic are connected, wherein the at least one secondary energy source has a respective second voltage characteristic that has an operating voltage range that overlaps the first voltage characteristic, and wherein the primary energy source and the at least one secondary energy source are connected, via a power switching apparatus, to a node of an intermediate circuit of the power supply system, to which node the load is connected, the method comprising the acts of:
   a) prior to disconnecting a respective secondary energy source, regulating a current drawn by the load such that a voltage that is present at the node of the intermediate circuit corresponds to a no-load voltage of the secondary energy source that is to be disconnected or is situated in a prescribed voltage range around the no load voltage;

b) when the voltages correspond to one another or when the voltage that is present at the node is situated in the prescribed voltage range, electrically isolating the secondary energy source from the node via the power switching apparatus; and c) regulating the current required by the load to a relevant value, the load being fed exclusively from the primary energy source.

8. The method according to claim 7, wherein the load is regulated over a defined minimal period of time.

9. The method according to claim 8, wherein the load is regulated in an order of magnitude of less than 100 msec.

10. The method according to claim 7, wherein measurement of a first voltage is performed at terminals of the primary energy source and measurement of a second voltage is performed at terminals of the at least one secondary energy source, the load regulation in act a) matching the voltage of the primary energy source to the no-load voltage of the secondary energy source that is to be switched.

11. The method according to claim 7, wherein the load regulation is carried out by influencing an operating point of the load.

12. The method according to claim 7, wherein the power supply system is a vehicle onboard power supply system.

13. A power supply system, comprising:
a load;
a primary energy source having a first voltage characteristic;
at least one secondary energy source, the at least one secondary energy source having a respective second voltage characteristic having an operating voltage range that overlaps the first voltage characteristic;
a power switching apparatus via which the at least one secondary energy source is connectable to a node of an intermediate circuit of the power supply system, to which node the load is also connected; and
a control unit for regulating current drawn by the load, the control unit being configured such that a voltage that is present at the node of the intermediate circuit when the at least one secondary energy source is to be connected to the node corresponds to a no-load voltage of the secondary energy source or is situated in a prescribed voltage range around the no-load voltage.

14. The power supply system according to claim 13, wherein the power switching apparatus of the primary energy source and of the at least one secondary energy source comprise, in each case, an associated controllable switching arrangement.

15. The power supply system according to claim 14, wherein each associated controllable switching arrangement comprises at least one semiconductor switching element or a contactor.

16. The power supply system according to claim 13, wherein the primary energy source is a fuel cell or a rechargeable battery.

17. The power supply system according to claim 13, wherein the secondary energy source is a rechargeable battery, a solar module or a fuel cell.

18. The power supply system according to claim 13, wherein the load is an actuating element to which at least one consumer is connected.

19. The power supply system according to claim 18, wherein the actuating element is a DC/DC converter or an AC/DC converter.

20. The power supply system according to claim 13, wherein the power supply system is a vehicle onboard power supply system.

* * * * *